United States Patent
Kim et al.

(10) Patent No.: US 10,033,984 B2
(45) Date of Patent: Jul. 24, 2018

(54) METHOD AND APPARATUS FOR PLAYING VIDEO

(71) Applicant: Samsung Electronics Co., Ltd., Gyeonggi-do (KR)

(72) Inventors: Chan-Hong Kim, Gyeonggi-do (KR); Jae-Min Kim, Gyeonggi-do (KR); Tae-Wan Kim, Gyeonggi-do (KR); Joong-Hwan Lim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 32 days.

(21) Appl. No.: 14/886,914

(22) Filed: Oct. 19, 2015

(65) Prior Publication Data

US 2016/0112698 A1    Apr. 21, 2016

(30) Foreign Application Priority Data

Oct. 17, 2014    (KR) .................... 10-2014-0140983

(51) Int. Cl.
| | |
|---|---|
| *H04N 5/775* | (2006.01) |
| *H04N 9/80* | (2006.01) |
| *H04N 13/00* | (2018.01) |
| *G11B 27/36* | (2006.01) |
| *G11B 27/28* | (2006.01) |
| *H04N 13/02* | (2006.01) |

(52) U.S. Cl.
CPC ......... *H04N 13/0055* (2013.01); *G11B 27/28* (2013.01); *G11B 27/36* (2013.01); *H04N 13/0285* (2013.01)

(58) Field of Classification Search
USPC .................. 386/230, 231, 234, 248, 262
See application file for complete search history.

(56) References Cited

U.S. PATENT DOCUMENTS

| | | | | |
|---|---|---|---|---|
| 5,905,845 | A * | 5/1999 | Okada ............ | G11B 20/10527 386/244 |
| 8,027,924 | B2* | 9/2011 | Sugimoto ........... | G11B 19/122 705/57 |
| 9,215,490 | B2* | 12/2015 | Won ................... | H04N 21/4223 |
| 2007/0103545 | A1 | 5/2007 | Listig et al. | |
| 2009/0041378 | A1* | 2/2009 | Yamaoka ............... | G06T 5/006 382/275 |
| 2011/0018868 | A1* | 1/2011 | Inoue ................ | H04N 13/0278 345/419 |
| 2011/0126159 | A1* | 5/2011 | Ko ..................... | G06F 3/04847 715/848 |
| 2012/0308193 | A1* | 12/2012 | Takayama ............ | H04N 5/783 386/230 |
| 2014/0210710 | A1* | 7/2014 | Shin ..................... | G06T 11/60 345/156 |

\* cited by examiner

*Primary Examiner* — Nigar Chowdhury
(74) *Attorney, Agent, or Firm* — The Farrell Law Firm, P.C.

(57) ABSTRACT

A method of playing video on an electronic device is provided. The method includes playing a video in a first mode, detecting attribute information of the video as the video is being played in the first mode, changing the first mode to a second mode based on the detected attribute information, and playing the video in the second mode.

15 Claims, 13 Drawing Sheets

METHOD AND APPARATUS FOR PLAYING VIDEO

PRIORITY

This application claims priority under 35 U.S.C. § 119(a) to Korean Patent Application Serial No. 10-2014-0140983, which was filed in the Korean Intellectual Property Office on Oct. 17, 2014, the entire content of which is incorporated herein by reference.

BACKGROUND

1. Field of the Invention

The present invention relates generally to an electronic device, and more particularly, to a method and an electronic device for playing a video.

2. Description of the Related Art

As information communication technologies and semiconductor technologies have developed, various electronic devices have been developed as multimedia devices that provide various multimedia services. For example, an electronic device provides various multimedia services such as a messenger service, a broadcasting service, a wireless Internet service, a camera service, a music playing service and an image playing service.

The image playing service refers to a service which displays video contents, to a user, in a 2D (two dimensional) or 3D (three dimensional) mode through a display screen. In addition, an electronic device provides an image playing service capable of playing video contents (hereinafter, a "360 degree video") which are generated by a camera having a 360 degree photographing function and which may be viewed in a 360 degree view.

The existing image playing service may display a 360 degree video in only a 360 degree mode and may display a 2D video in only a 2D mode. In addition, although a video may be displayed in both the 360 degree view and the 2D view, the video is played from a start point to an end point in a play mode.

SUMMARY

The present invention has been made to address at least the above mentioned problems and/or disadvantages and to provide at least the advantages described below. According to an aspect of the present invention, there is provided a method and an apparatus for playing a video by changing a first mode to a second mode while the video is being played in the first mode of an electronic device.

In accordance with an aspect of the present invention, there is provided a method of playing video on an electronic device. The method includes playing a video in a first mode, detecting attribute information of the video as the video is being played in the first mode, changing the first mode to a second mode based on the detected attribute information, and playing the video in the second mode.

In accordance with an aspect of the present invention, there is provided an apparatus. The apparatus includes a display and a processor that is configured to control the display, play a video in a first mode through the display, detect attribute information of the video as the video is being played in the first mode, change from the first mode to a second mode based on the detected attribute information, and play the video in the second mode.

In accordance with an aspect of the present invention, there is provided a non-transitory computer readable storage medium having stored thereon a set of computer readable instructions that when executed perform a method of playing video on an electronic device. The method includes playing a video in a first mode, detecting attribute information of the video as the video is being played in the first mode, changing the first mode to a second mode based on the detected attribute information, and playing the video in the second mode.

According to an aspect of the present invention, there is provided a method and an apparatus for playing a video and changing a mode to an optimal play mode while playing the video, thereby providing a vivid image of the playing video to a user of the apparatus, which may increase a user's overall enjoyment of watching the video on the apparatus.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 1:
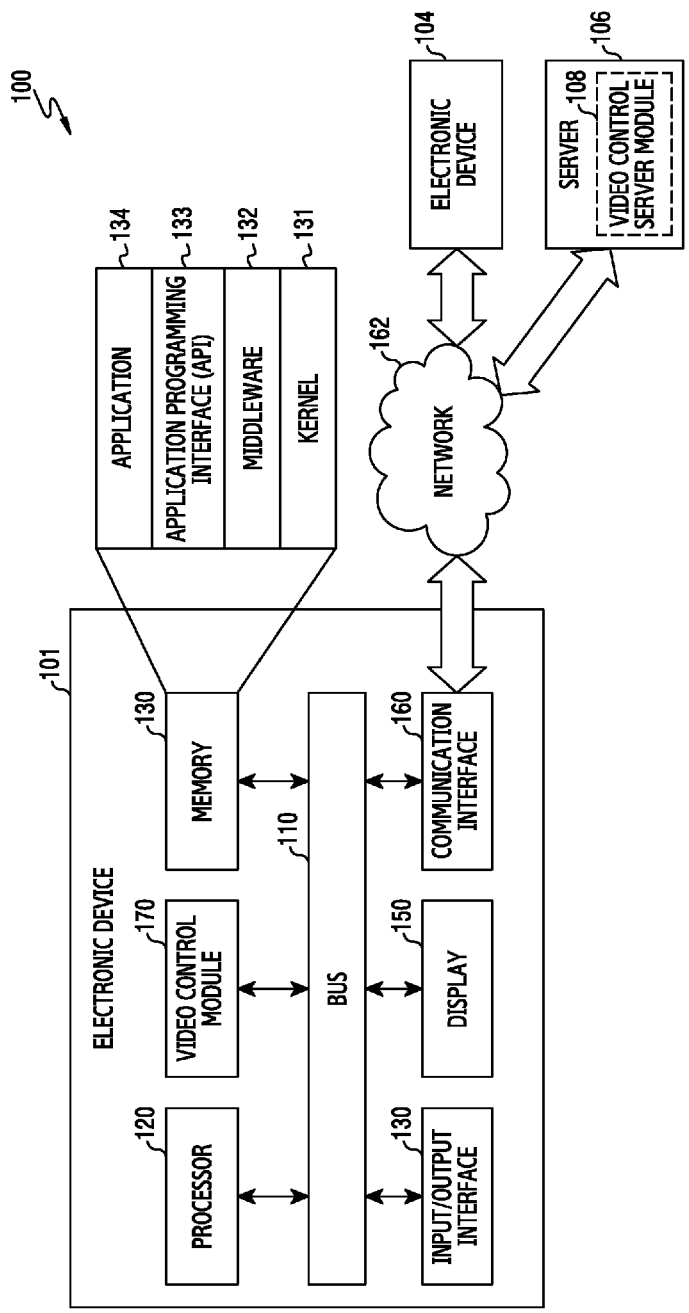
FIG. 1 is a diagram of an electronic device, according to an embodiment of the present invention.

Hereinafter, the present invention will be described with reference to the accompanying drawings. The present invention may have various embodiments, and modifications and changes may be made therein. Therefore, the present invention will be described in detail with reference to particular embodiments shown in the accompanying drawings. However, it should be understood that there is no intent to limit the present invention to the particular forms, and the present invention should be construed to cover all modifications, equivalents, and/or alternatives falling within the spirit and scope of the present invention. In describing the drawings, similar elements are designated by similar reference numerals.

As used herein, the expressions "include" or "may include" refer to the existence of a corresponding function, operation, or constituent element, and does not limit one or more additional functions, operations, or constituent elements. Further, as used herein, the terms such as "include" or "have" may be construed to denote a certain characteristic, number, step, operation, constituent element, component or a combination thereof, but are not to be construed to exclude the existence of or a possibility of addition of one or more other characteristics, numbers, steps, operations, constituent elements, components or combinations thereof.

As used herein, the expression "or" includes any or all combinations of words enumerated together. For example, the expression "A or B" may include A, may include B, or may include both A and B.

While expressions including ordinal numbers, such as "first" and "second", as used herein, may modify various constituent elements, such constituent elements are not limited by the above expressions. For example, the above expressions do not limit the sequence and/or importance of the corresponding constituent elements. The above expressions may be used merely for the purpose of distinguishing a constituent element from other constituent elements. For example, a first user device and a second user device indicate different user devices although both are user devices. For example, a first constituent element may be referred to as a second constituent element, and likewise a second constituent element may also be referred to as a first constituent element without departing from the scope of the present disclosure.

When a component is referred to as being "connected" or "accessed" to any other component, it should be understood that the component may be directly connected or accessed to the other component, but another new component may also be interposed between them. Contrarily, when a component is referred to as being "directly connected" or "directly accessed" to any other component, it should be understood that there is no new component between the component and the other component.

The terms as used herein are merely for the purpose of describing particular embodiments and are not intended to limit the present invention. Singular forms are intended to include plural forms unless the context clearly indicates otherwise.

Unless defined otherwise, all terms used herein, including technical terms and scientific terms, have the same meaning as commonly understood by a person of ordinary skill in the art to which the present invention pertains. Such terms as those defined in a generally used dictionary are to be interpreted to have the same meanings as the contextual meanings in the relevant field of art, and are not to be interpreted to have ideal or excessively formal meanings unless clearly defined in the present disclosure.

The term "module" as used herein, for example, may mean a unit including one of hardware, software, and firmware or any combination of two or more of them. The "module", for example, may be interchangeable with the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" may include at least one of an application-specific integrated circuit (ASIC) chip, a field-programmable gate arrays (FPGA), and a programmable-logic device for performing certain operations, which are now known or will be developed in the future.

An electronic device as described herein may be a device including a communication function. For example, the electronic device may include, but is not limited to, a smartphone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MP3 player, a mobile medical appliance, a camera, and a wearable device (e.g., a Head-Mounted-Device (HMD) such as electronic glasses, electronic clothes, an electronic bracelet, an electronic necklace, an electronic appcessory, electronic tattoos, or a smartwatch).

The electronic device may be a smart home appliance with a communication function. The smart home appliance may include, but is not limited to, a television, a Digital Video Disk (DVD) player, an audio, a refrigerator, an air conditioner, a vacuum cleaner, an oven, a microwave oven, a washing machine, an air cleaner, a set-top box, a TV box (e.g., Samsung HomeSync®, Apple TV®, or Google TV®), a game console, an electronic dictionary, an electronic key, a camcorder, and an electronic photo frame.

The electronic device may include, but is not limited to, various medical devices (e.g., Magnetic Resonance Angiography (MRA), Magnetic Resonance Imaging (MRI), Computed Tomography (CT), and ultrasonic machines), navigation equipment, a Global Positioning System (GPS) receiver, an Event Data Recorder (EDR), a Flight Data Recorder (FDR), an automotive infotainment device, electronic equipment for ships (e.g., ship navigation equipment and a gyrocompass), avionics, security equipment, a vehicle head unit, an industrial or home robot, an Automatic Teller Machine (ATM) of a banking system, and a Point Of Sale (POS) in a shop.

The electronic device may include, but is not limited to, a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. Further, the electronic device may be a flexible device. Further, it will be apparent to those skilled in the art that the electronic device is not limited to the aforementioned devices.

Hereinafter, an electronic device will be discussed with reference to the accompanying drawings. The term "a user" as used herein may refer to any person who uses an electronic device or any other device (e.g., an artificial intelligence electronic device) using an electronic device.

An electronic device as described herein provides a video playing mode capable of playing video contents which are generated by a camera having a 360 degree photographing function, thereby allowing a 360 degree view of the video contents.

FIG. 1 is a diagram illustrating a network environment 100 including an electronic device 101, according to an embodiment of the present invention.

Referring to FIG. 1, the electronic device 101 includes a bus 110, a processor 120, a memory 130, an input/output interface 140, a display 150, a communication interface 160, and a video control module 170.

The bus 110 may be a circuit interconnecting the aforementioned components and transmitting communication (e.g., a control message) between the aforementioned components.

The processor 120, for example, receives instructions from the aforementioned components (e.g., the memory 130, the input/output interface 140, the display 150, the communication interface 160, and the video control module 170) through the bus 110, decodes the received instructions, and performs operations or data processing according to the decoded instructions.

The memory 130 stores instructions or data received from or generated by the processor 120 or other components (e.g., the input/output interface 140, the display 150, the communication interface 160, and the video control module 170). The memory 130 includes programming modules, for example, a kernel 131, middleware 132, an application programming interface (API) 133, and applications 134. Each of the programming modules as described above may be formed by software, firmware, hardware, or a combination of two or more thereof.

The kernel 131 controls or manages system resources (e.g., the bus 110, the processor 120, and the memory 130) used to execute operations or functions implemented in the remaining other programming modules, for example, the middleware 132, the API 133, and the applications 134. Further, the kernel 131 provides an interface that allows the middleware 132, the API 133, or the applications 134 to access and control or manage individual components of the electronic device 101.

The middleware 132 serves to mediate between the API 133 or the applications 134 and the kernel 131, that is, allows the API 133 or the application 134 to communicate and exchange data with the kernel 131. Further, the middleware 132 performs control (e.g., scheduling or load balancing) for task requests received from the applications 134 by using, for example, a method of assigning a priority for use of the system resource (e.g., the bus 110, the processor 120, or the memory 130) of the electronic device 101 to at least one of the applications 134.

The API 133 is an interface for allowing the applications 134 to control functions provided by the kernel 131 and the middleware 132, and may include at least one interface or function (e.g., instruction) for, for example, file control, window control, image processing, or text control.

The applications 134 may include an SMS/MMS application, an e-mail application, a calendar application, an alarm application, a health care application (e.g., an application for measuring the amount of exercise or blood glucose), and an environmental information application (e.g., an application for providing atmospheric pressure information, humidity information, temperature information, and the like). Additionally or alternatively, the applications 134 may include an application associated with information exchange between the electronic device 101 and an external electronic device (e.g., an electronic device 104). The application associated with information exchange, for example, may include a notification relay application for transferring specific information to the external electronic device or a device management application for managing the external electronic device.

For example, the notification relay application may include a function of transferring notification information, generated in another application of the electronic device 101 (e.g., the SMS/MMS application, the e-mail application, the health care application, or the environmental information application), to an external electronic device 104. Additionally or alternatively, the notification relay application, for example, may receive notification information from an external electronic device (e.g., the electronic device 104) and provide the received notification information to a user. The device management application, for example, may manage (e.g., install, remove, or update) a function for at least a part of an external electronic device 104 communicating with the electronic device 101 (e.g., a function of turning on/off an external electronic device itself (or some components thereof) or adjusting the brightness (or resolution) of a display), an application running on the external electronic device, or a service provided in the external electronic device (e.g., a calling or messaging service).

The applications 134 may include an application specified according to an attribute (e.g., type) of an external electronic device 104. For example, when the external electronic device is an MP3 player, the applications 134 may include an application associated with music playback. Similarly, when the external electronic device is a mobile medical device, the applications 134 may include an application associated with health care. The applications 134 may include at least one of an application assigned to the electronic device 101 and an application received from an external electronic device (e.g., a server 106 or the electronic device 104).

The input/output interface 140, for example, transfers instructions or data, input from a user through an input/output device (e.g., a sensor, a keyboard, or a touch screen), to the processor 120, the memory 130, the communication interface 160, or the video control module 170 through the bus 110. For example, the input/output interface 140 provides the processor 120 with data corresponding to a user's touch input through a touch screen. Further, the input/output interface 140 may, for example, receives instructions or data from the processor 120, the memory 130, the communication interface 160, or the video control module 170 through the bus 110 and outputs the received instructions or data through the input/output device (e.g., a speaker or a display). For example, the input/output interface 140 outputs voice data processed by the processor 120 to a user through a speaker.

The display 150 displays various pieces of information (e.g., multimedia data or text data) to a user.

The communication interface 160 establishes communication between the electronic device 101 and an external electronic device 104 or the server 106. For example, the communication interface 160 may be connected to the network 162 through wireless or wired communication for communicating with the external device. The wireless communication, for example, may include at least one of Wireless Fidelity (WiFi®), Bluetooth® (BT), Near Field Communication (NFC), a GPS, and cellular communication (e.g., LTE, LTE-A, CDMA, CDMA, UMTS, WiBro, or GSM). The wired communication, for example, may include at least one of a Universal serial Bus (USB), a High Definition Multimedia Interface (HDMI), Recommended Standard 232 (RS-232), and a Plain Old Telephone Service (POTS).

The network 162 may be a telecommunications network. The telecommunications network may include at least one of a computer network, the Internet, the Internet of things, and a telephone network. A protocol (e.g., a transport layer protocol, a data link layer protocol, or a physical layer protocol) for communication between the electronic device 101 and an external device may be supported by at least one of the applications 134, the application programming interface 133, the middleware 132, the kernel 131, and the communication interface 160.

The video control module 170 changes a play mode of a video which is currently being played on the electronic device 101 to another play mode. For example, the video control module 170 detects attribute information of a video which is being played in a first mode (e.g., a 2D mode), and may change the play mode from the first mode to a second mode (e.g., a 360 degree mode) according to the detected attribute information. Here, the video may include contents which may be played in the 2D mode and the 360 degree mode. The video control module 170 controls a media player which may play the video in the 2D mode and the 360 degree mode.

The video control module 170 identifies file information or section information included in the attribute information of the video. For example, the video control module 170 identifies a video generation method, a pressure type, a play method, a memory capacity and the like included in the file information. In addition, the video control module 170 identifies a running time, a start time, a duration time, a finish time, section meta information of the video included in the section information. The video control module 170 obtains the section information while playing the video in real time.

The video control module 170 changes the play mode to the second mode according to whether the detected attribute information is related to the second mode. The video control module 170 determines whether the video may be played in the second mode by identifying the file information or the section information of the video. For example, the video control module 170 determines whether the video may be played in the second mode by identifying the video generation method or the play method of the file information. Alternatively, the video control module 170 determines whether the video may be played in the second mode by identifying the start time and the duration time of the video or the start time and the finish time of the video of the section information. However, the video control module 170 is not limited thereto, and the video control module 170 may determine whether to change the play mode to the second mode by identifying various pieces of attribute information.

The server 106 supports driving of the electronic device 101 by conducting at least one of the operations (or functions) implemented by the electronic device 101. For example, the server 106 may include a video control server module 108 which may support the video control module 170 implemented by the electronic device 101. The video control server module 108 may include at least one component of the video control module 170 to perform (e.g., replace) at least one of the operations performed by the video control module 170.

The video control module 170 processes at least some of the information acquired from other components (for example, the processor 120, the memory 130, the input/output interface 140, the communication interface 160, or the like) and may provide some of the processed information to a user in various schemes. For example, the video control module 170 controls at least some functions of the electronic device 100 such that the electronic device 100 is linked to other electronic devices (e.g., the electronic device 104 and the server 106), using or independently from the processor 120. At least one element of the video control module 170 may be included in the server 106 (e.g., the video control server module 108), and the server 106 may support at least one operation implemented in the video control module 170.

Figure 2:
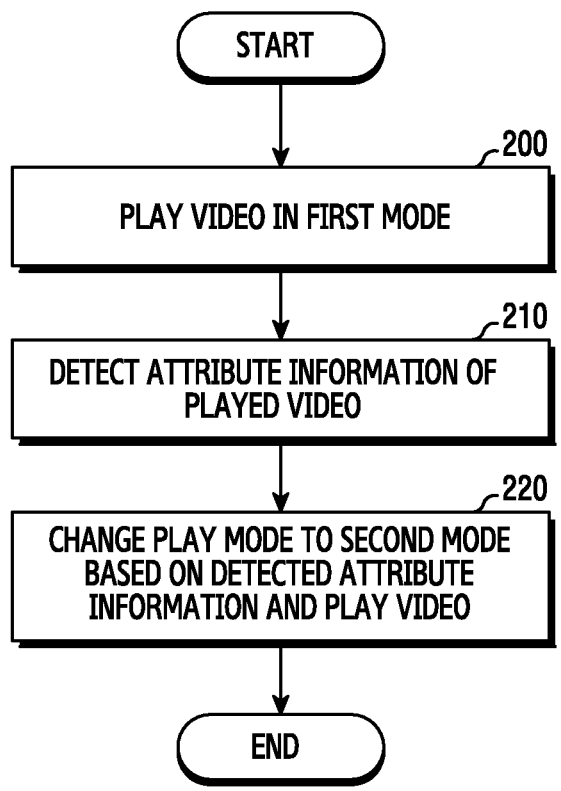
FIG. 2 is a flowchart illustrating a method of playing a video based on attribute information of the video, according to an embodiment of the present invention.

FIG. 2 is a flowchart illustrating a method of playing a video based on the attribute information of the video, according to an embodiment of the present invention.

Figure 3:
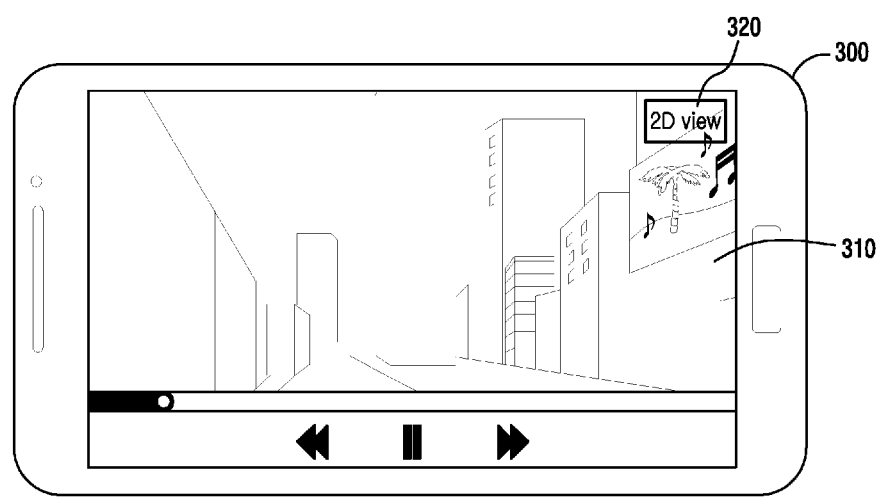
FIG. 3 is a diagram illustrating a display screen in which a video is played in a 2D mode, according to an embodiment of the present invention.

Referring to FIG. 2, in step 200, the electronic device 101 plays the video in a first mode. Here, the video may include video contents which may be played in the 2D mode or the 360 degree mode. The electronic device 101 executes a media player capable of playing the video in the 2D mode or the 360 degree mode. As shown in FIG. 3, the electronic device 101 may be embodied in an electronic device 300 which displays a video screen 310 in the first mode (e.g., a 2D mode). For example, when the electronic device 300 plays the video in the 2D mode, the electronic device 300 displays a guide phrase 320 "2D view" in the video screen 310. The guide phrase 320 may be displayed on the video screen 310 in an overlay method, may be located in a specific area of the screen to be displayed in the specific area of the screen, or may be configured to disappear after a predetermined time is elapsed.

In step 210, the electronic device 101 detects attribute information of the video being played. For example, the electronic device 101 identifies file information or section information of the video being played. For example, the electronic device 101 identifies a video generation method, a pressure type, a play method, a memory capacity and the like included in the file information. Alternatively, the electronic device 101 identifies a running time, a start time, a duration time, a finish time, section meta information or the like of the video included in the section information. The electronic device 101 obtains the section information while playing the video in real time.

In step 220, the electronic device 101 changes the play mode from the first mode to the second mode based on the detected attribute information and plays the video in the second mode. The electronic device 101 changes the first mode to the second mode according to whether the detected attribute information is related to the second mode. The electronic device 101 determines whether the video may be played in the second mode by identifying the file information or the section information of the video. For example, the electronic device 101 determines whether the video may be played in the second mode by identifying the video generation method or the play method of the file information. Alternatively, the electronic device 101 determines whether the video may be played in the second mode by identifying the start time and the duration time of the video or the start time and the finish time of the video of the section information. In addition, the electronic device 101 determines whether the video may be played in the second mode by determining the section meta information related to the second mode among the pieces of the section information of the video. However, the electronic device 101 is not limited thereto, and the electronic device 101 determines whether to change the play mode from the first mode to the second mode by identifying various pieces of attribute information.

The electronic device 101 changes the video currently being played from the first mode to the second mode and plays the video in the second mode.

Figure 4:
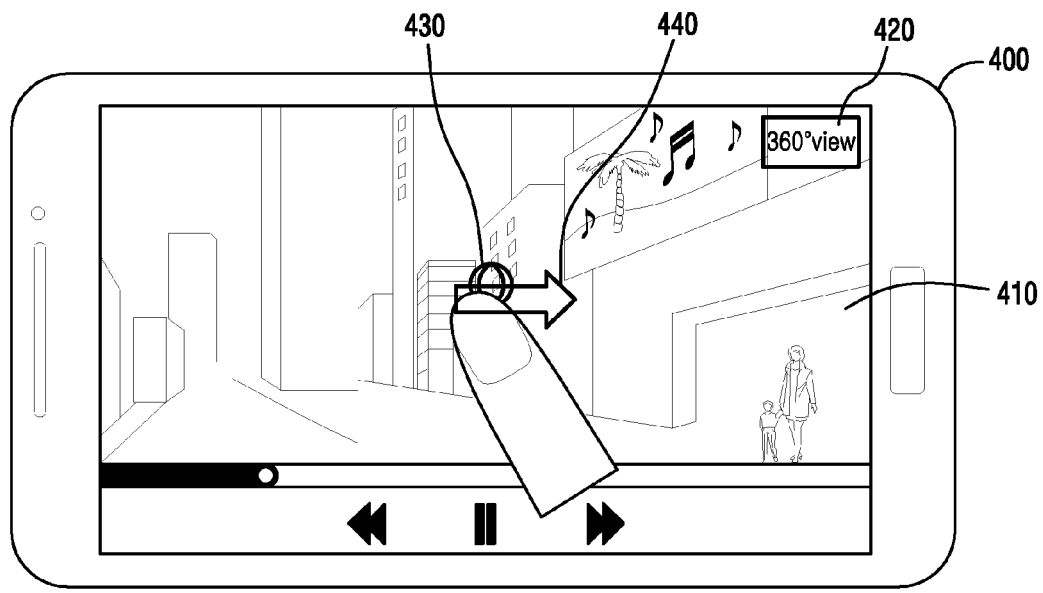
FIG. 4 is a diagram illustrating a display screen in which a video is played in a 360 degree mode, according to an embodiment of the present invention.

As shown in FIG. 4, the electronic device 101 may be embodiment in an electronic device 400 which displays a video screen 410 in the second mode (e.g., the 360 degree mode). For example, the electronic device 400 displays a symbol 430 such that a user views the video in 360 degrees. The user may manipulate the symbol 430 to view an image photographed in different angle related to the video screen

410. For example, the electronic device 400 displays the video screen 410 in various angles according to a touch or a drag 440 of the user for the symbol 430. In addition, when the electronic device 400 changes the play mode to the 360 degree mode and plays the video, the electronic device 400 displays a guide phrase 420 "360° view" in the video screen 410. The guide phrase 420 may be displayed on the video screen 410 in an overlay method, may be located in a specific area of the screen to be displayed in the specific area of the screen, or may be configured to disappear after a predetermined time is elapsed.

The electronic device 101 changes the play mode of the video being played in the second mode to the first mode again and plays the video in the first mode. For example, the electronic device 101 changes the video from the 360 degree mode to the 2D mode and plays the video in the 2D mode.

Only changing of the video which is being played in the 2D mode to the 360 degree mode, and vice versa, and playing of the video to the changed mode is described, but the various embodiments are not limited thereto. For example, the video which is being played in the 360 degree mode may be changed to the 2D mode, and vice versa, and a change time may be configured according to a user selection.

Figure 5:
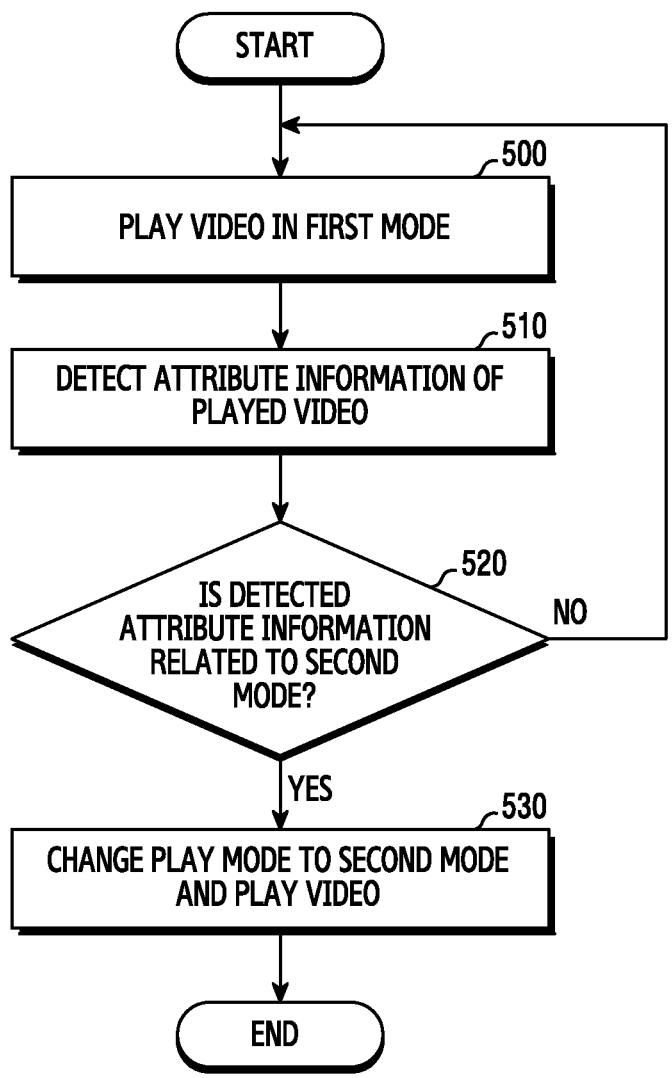
FIG. 5 is a flowchart illustrating a method of playing a video based on attribute information of the video, according to an embodiment of the present invention.

FIG. 5 is a flowchart illustrating a method of playing a video based on the attribute information of the video, according to an embodiment of the present invention.

Referring to FIG. 5, in step 500, the electronic device 101 plays the video in the first mode. Here, the video may include video contents which may be played in the 2D mode or the 360 degree mode. The electronic device executes a media player capable of playing the video in the 2D mode or the 360 degree mode. As shown in FIG. 3, the electronic device 300 displays the video screen 310 in the first mode (e.g., a 2D mode). For example, when the electronic device 300 plays the video in the 2D mode, the electronic device 300 displays the guide phrase 320 "2D view" in the video screen 310. The guide phrase 320 may be displayed on the video screen 310 in an overlay method, may be located in a specific area of the screen to be displayed in the specific area of the screen, or may be configured to disappear after a predetermined time has elapsed.

In step 510, the electronic device 101 detects attribute information of the video being played. The electronic device 101 identifies the file information or the section information of the video. For example, the electronic device 101 identifies a video generation method, a pressure type, a play method, a memory capacity and the like included in the file information. Alternatively, the electronic device 101 identifies a running time, a start time, a duration time, a finish time, section meta information or the like of the video included in the section information. The electronic device obtains the section information while playing the video in real time.

In step 520, the electronic device 101 determines whether the detected attribute information is related to the second mode. The electronic device determines whether the video may be played in the second mode by identifying the file information or the section information of the video. For example, the electronic device determines whether the video may be played in the second mode by identifying the video generation method or the play method of the file information. Alternatively, the electronic device 101 determines whether the video may be played in the second mode by identifying the start time and the duration time of the video or the start time and the finish time of the video of the section information. In addition, the electronic device 101 determines whether the video may be played in the second mode by determining the section meta information related to the second mode in the section information of the video. However, the electronic device 101 is not limited thereto, and the electronic device 101 may identify various pieces of attribute information to determine if the attribute information is related to the second mode.

When the detected attribute information is not related to the second mode, the electronic device 101 performs step 500 again. When the detected attribute information is not related to the second mode, the electronic device 101 maintains the first mode which is being used to play current video.

When the detected attribute information is related to the second mode, in step 530, the electronic device 101 changes the play mode to the second mode and plays the video in the second mode. The electronic device 101 changes the video currently being played in the first mode to the second mode and play the video in the second mode. As shown in FIG. 4, the electronic device 400 displays the video screen 410 in the second mode (e.g., the 360 degree mode). For example, the electronic device 400 displays the video screen 410 in various angles according to the touch or drag in the video screen 410. In addition, when the electronic device 400 changes the play mode to the 360 degree mode and plays the video, the electronic device 400 displays the guide phrase 420 "360° view" in the video screen 410. The guide phrase 420 may be displayed on the video screen 410 in an overlay method, may be located in a specific area of the screen to be displayed in the specific area of the screen, or may be configured to disappear after a predetermined time is elapsed.

Figure 6:
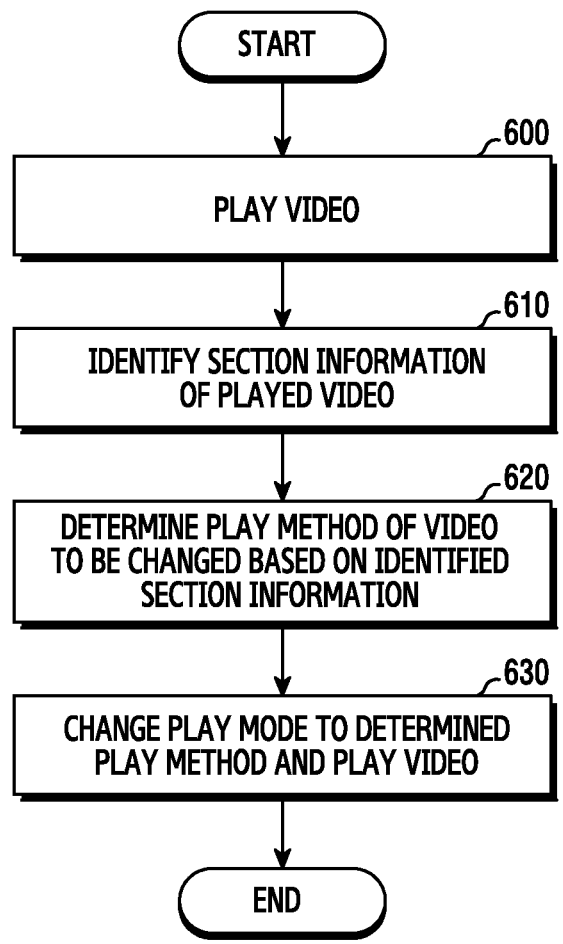
FIG. 6 is a flowchart illustrating a method of playing a video based on section information of the video, according to an embodiment of the present invention.

FIG. 6 is a flowchart illustrating a method of playing a video based on the section information of the video, according to an embodiment of the present invention.

Referring to FIG. 6, in step 600, the electronic device (101 plays the video. Here, the video may include video contents which may be played in two or more modes among the 2D mode, the 3D mode and the 360 degree mode. The electronic device 101 executes a media player capable of playing the video in two or more modes among the 2D mode, the 3D mode and the 360 degree mode.

In step 610, the electronic device 101 identifies the section information of the played video. The electronic device 101 obtains the section information while playing the video in real time. For example, the electronic device 101 identifies a running time, a start time, a duration time, a finish time, section meta information and the like of the video included in the section information.

In step 620, the electronic device 101 determines a play method of the video which is changed based on the identified section information. For example, when the electronic device 101 plays the video in the 2D mode, the electronic device 101 selects the play method to be changed, in the 3D mode or the 360 degree mode.

In step 630, the electronic device 101 changes the play method to the determined play method and plays the video according to the determined play method. When the electronic device plays the video in the 2D mode, the electronic device 101 changes the play mode to the determined play mode in the 3D mode or the 360 degree mode. For example, the electronic device 101 changes the video being played in the 3D mode or the 360 degree mode to the 2D mode and play the video in the 2D mode. The electronic device 101 informs or provides an indication to user of the play mode currently being used to play the video and the play mode to be changed to. In addition, the electronic device 101 may provide an option (e.g., a pop-up window) for a user to change between play modes.

Figure 7:
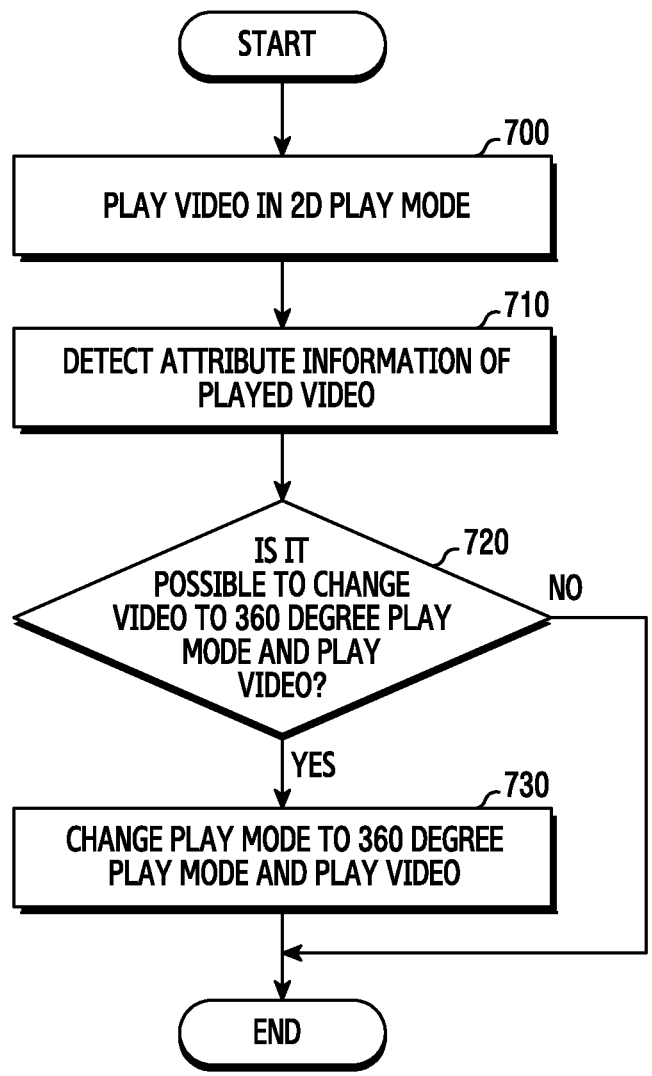
FIG. 7 is a flowchart illustrating a method of playing a video based on attribute information of the video, according to an embodiment of the present invention.

FIG. 7 is a flowchart illustrating a method of playing a video based on the attribute information of the video, according to an embodiment of the present invention.

Referring to FIG. 7, in step 700, the electronic device (101 plays the video in the 2D play mode. Here, the video may include video contents which may be played in the 2D mode or the 360 degree mode. The electronic device 101 executes a media player capable of playing the video in the 2D mode or the 360 degree mode. As shown in FIG. 3, the electronic device 300 displays the video screen 310 in the 2D mode. For example, the electronic device 300 displays the guide phrase 320 "2D view" in the video screen 310. The guide phrase 320 may be displayed on the video screen 310 in an overlay method, may be located in a specific area of the screen to be displayed in the specific area of the screen, or may be configured to disappear after a predetermined time is elapsed.

In step 710, the electronic device 101 detects attribute information of the video being played. The electronic device 101 identifies the file information or the section information of the video being played. For example, the electronic device 101 identifies a video generation method, a pressure type, a play method, a memory capacity and the like included in the file information. Alternatively, the electronic device 101 identifies a running time, a start time, a duration time, a finish time, section meta information or the like of the video included in the section information. The electronic device 101 obtains the section information while playing the video in real time.

In step 720, the electronic device 101 determines whether to change the current play mode to the 360 degree mode and play the video in the 360 degree play mode. The electronic device 101 determines whether the video may be played in the 360 degree mode by identifying the file information or the section information of the video. For example, the electronic device 101 determines whether the video may be played in the 360 degree mode by identifying the video generation method or the play method of the file information. Alternatively, the electronic device 101 determines whether the video may be played in the 360 degree mode by identifying the start time and the duration time of the video or the start time and the finish time of the video of the section information. In addition, the electronic device 101 determines whether the video may be played in the second mode by determining the section meta information related to the second mode in the section information of the video. However, the electronic device 101 is not limited thereto, and the electronic device 101 may determine whether the video may be played in the second mode by identifying various pieces of attribute information.

When it is possible to change the play mode to the 360 degree mode and play the video in the 360 degree mode, in step 730, the electronic device 101 changes the play mode to the 360 degree mode and play the video in the 360 degree mode. As shown in FIG. 4, the electronic device 400 displays the video screen 410 in the 360 degree mode. For example, the electronic device 400 may display the symbol 430 such that a user views the video in the 360 degree mode. The user may manipulate the symbol 430 to view an image photographed in a different angle related to the video screen 410. For example, the electronic device 400 displays the video screen 410 in various angles according to the touch or drag 440 of the user for the symbol 430. In addition, when the electronic device 400 changes the play mode to the 360 degree mode and plays the video in the 360 degree mode, the electronic device 400 displays the guide phrase 420 "360° view" in the video screen 410. The guide phrase 420 may be displayed on the video screen 410 in an overlay method, may be located in a specific area of the screen to be displayed in the specific area of the screen, or may be configured to disappear after a predetermined time has elapsed.

Only the changing of the video which is played in the 2D mode to the 360 degree mode, and vice versa, and playing of the video to the changed mode is described, but the various embodiments are not limited thereto. For example, the video which is being played in the 360 degree mode may be changed to the 2D mode, and vice versa, and a change time may be configured according to a user selection.

Figure 8:
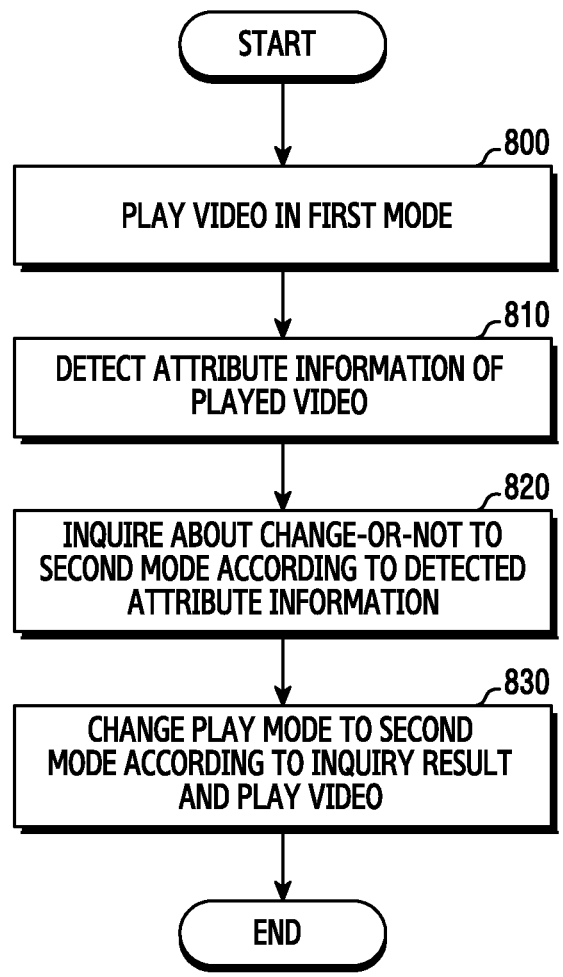
FIG. 8 is a flowchart illustrating a method of playing a video based on attribute information of the video, according to an embodiment of the present invention.

FIG. 8 is a flowchart illustrating a method of playing a video based on the attribute information of the video, according to an embodiment of the present invention.

Figure 9:
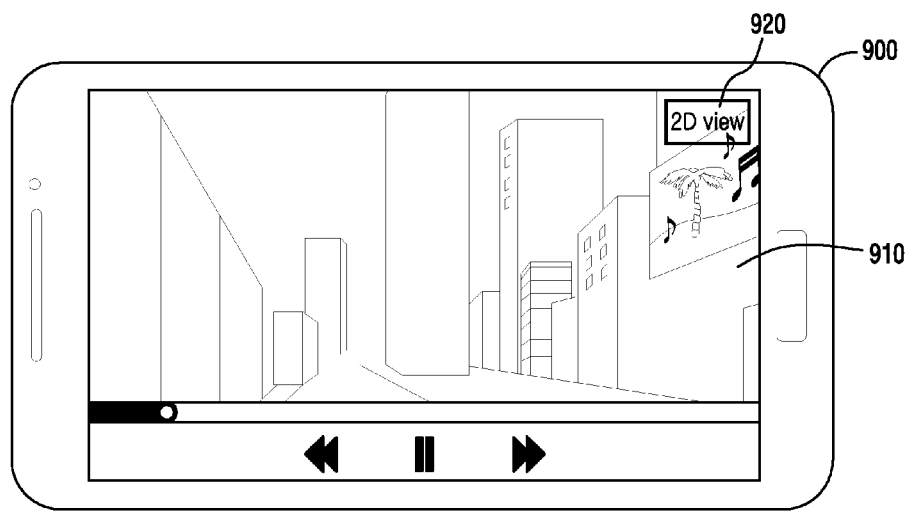
FIG. 9 is a diagram illustrating a display screen in which a video is played in a 2D mode, according to an embodiment of the present invention.

Referring to FIG. 8, in step 800, the electronic device 101 plays the video in the first mode. Here, the video may include video contents which may be played in the 2D mode and the 360 degree mode. The electronic device 101 executes a media player capable of playing the video in the 2D mode and the 360 degree mode. As shown in FIG. 9, the electronic device 101 may be embodied in an electronic device 900 which may display a video screen 910 in the first mode (e.g., a 2D mode). For example, when the electronic device 900 plays the video in the 2D mode, the electronic device 900 displays a guide phrase 920 "2D view" in the video screen 910. The guide phrase 920 may be displayed on the video screen 910 in an overlay method, may be located in a specific area of the screen to be displayed in the specific area of the screen, or may be configured to disappear after a predetermined time has elapsed.

In step 810, the electronic device 101 detects the attribute information of the played video. The electronic device 101 identifies the file information or the section information of the video. For example, the electronic device 101 identifies a video generation method, a pressure type, a play method, a memory capacity and the like included in the file information. Alternatively, the electronic device 101 identifies a running time, a start time, a duration time, a finish time, section meta information or the like of the video included in the section information. The electronic device 101 may obtain the section information while playing the video in real time.

Figure 10:
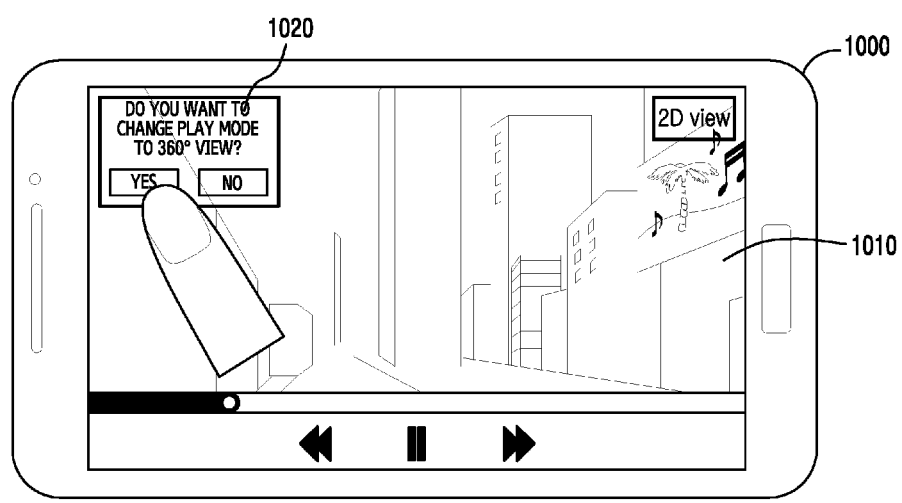
FIG. 10 is a diagram illustrating a screen configuration for changing a video which is played in a 2D mode to a 360 degree mode and playing the video, according to an embodiment of the present invention.

In step 820, the electronic device 101 provides an option for a user to change from the second mode according to the detected attribute information. The electronic device 101 determines whether the video may be played in the second mode by identifying the file information or the section information of the video. For example, the electronic device 101 determines whether the video may be played in the second mode by identifying the video generation method or the play method of the file information. Alternatively, the electronic device 101 determines whether the video may be played in the second mode by identifying the start time and the duration time of the video or the start time and the finish time of the video of the section information. In addition, the electronic device 101 determines whether the video may be played in the second mode by determining the section meta information related to the second mode in the section information of the video. When the video may be played in the second mode, the electronic device 101 provides an option to a user to change a mode currently being used to play a video to the second mode and plays the video in the second mode upon the user selecting such an option. For example, as shown in FIG. 10, the electronic device 101 may be embodied in an electronic device 1000 which may output a guide phrase 1020 indicating whether the electronic device 1000 should change the play mode to the second mode in a video screen 1010. For example, the user may select the option to change from the second mode through the guide phrase 1020. The guide phrase 1020 may be configured to automatically disappear after a predetermined time has elapsed, and a current play mode may be maintained.

Figure 11:
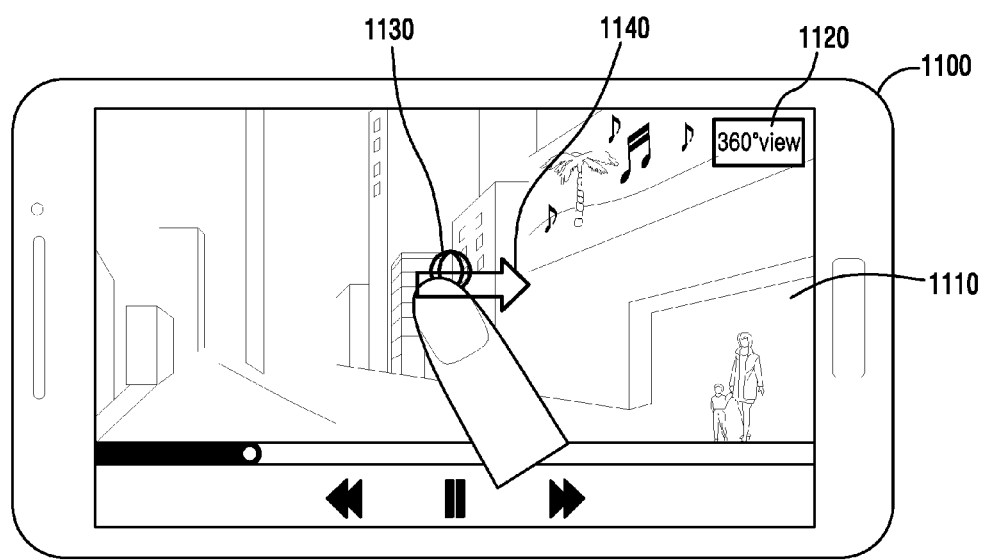
FIG. 11 is a diagram illustrating a display screen in which a video is played in a 360 degree mode, according to an embodiment of the present invention.

In step 830, the electronic device 101 changes the play mode to the second mode according to a result of the option to change modes and plays the video in the second mode. The electronic device 101 may change the video currently being played in the first mode to the second mode and play the video in the second mode. As shown in FIG. 11, the electronic device 101 may be embodied in an electronic device 1100 which may display a video screen 1110 in the second mode (e.g., the 360 degree mode). For example, when the electronic device 1100 changes the play mode to the 360 degree mode, the electronic device 1100 displays a symbol 1130 such that a user views the video in 360 degrees. The user may manipulate the symbol 1130 to view an image photographed in a different angle related to the video screen 1110. For example, the electronic device 1100 displays the video screen 1110 in various angles according to a touch or a drag 1140 of the user for the symbol 1130. In addition, when the electronic device 1100 changes the play mode to the 360 degree mode and plays the video in the 360 degree mode, the electronic device 1100 displays a guide phrase 1120 "360° view" in the video screen 1110. The guide phrase 1120 may be displayed on the video screen 1110 in an overlay method, may be located in a specific area of the screen to be displayed in the specific area of the screen, or may be configured to disappear after a predetermined time has elapsed.

Figure 12:
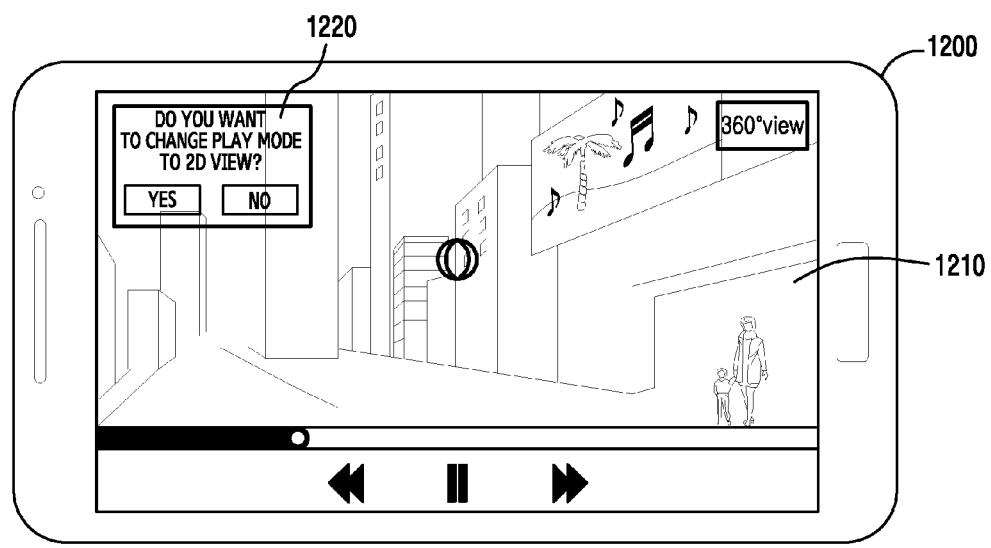
FIG. 12 is a diagram illustrating a screen configuration for changing a video which is played in a 360 degree mode to a 2D mode and playing the video, according to an embodiment of the present invention.

The electronic device 101 may change the play mode of the video played in the second mode to the first mode again and play the video in the first mode. For example, as shown in FIG. 12, the electronic device 1200 outputs, to a video screen 1210, a guide phrase 1220 for changing the video played in the second mode (e.g., the 360 degree mode) to the first mode (e.g., the 2D mode) again. For example, the user may select whether to change the play mode to the first mode through the guide phrase 1220. The user may select whether to change the play mode through various input methods such as a voice recognition and a gaze recognition.

The guide phrase 1220 may be configured to disappear automatically after a predetermined time has elapsed, and a current play mode may be maintained.

The electronic device 101 may manually or automatically set the mode change (e.g., the change from the first mode to the second mode) of the video being played. For example, the electronic device 101 may set a block of the video being played for a specific mode change. If the electronic device 101 detects the 3D mode by the attribute information of the video being played when the electronic device 101 is playing the video in the 2D mode, the electronic device 101 may provide an option for this change to a user through an icon display and may change from the 2D mode to the 3D mode according to a specific input (e.g., an icon touch or a configuration motion) received from the user. The electronic device 101 may change the play mode of the video through various input methods such as a voice recognition and a gaze recognition. When the electronic device 101 is configured for use with various wearable devices, such as a Head Mounted Device (HMD), the electronic device 101 may change the play mode automatically according to a corresponding device attribute.

Figure 13:
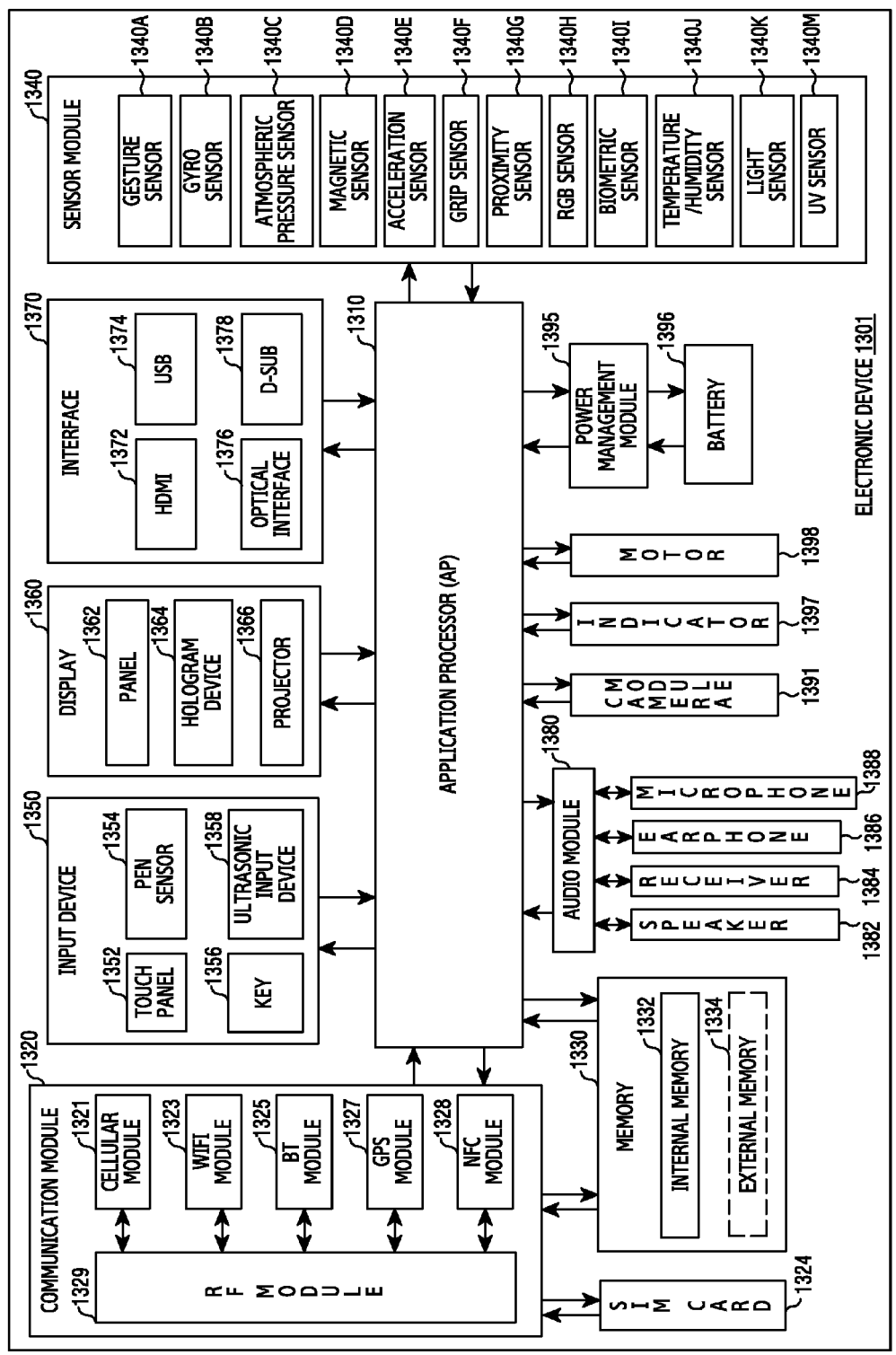
FIG. 13 is a diagram of an electronic device, according to an embodiment of the present invention.

FIG. 13 is a diagram of an electronic device 1301 according to an embodiment of the present invention. All or some of the components of the electronic device 101 illustrated in FIG. 1 may be provided in the electronic device 1301.

Referring to FIG. 13, the electronic device 1301 includes one or more Application Processors (APs) 1310, a communication module 1320, a Subscriber Identification Module (SIM) card 1324, a memory 1330, a sensor module 1340, an input device 1350, a display 1360, an interface 1370, an audio module 1380, a camera module 1391, a power managing module 1395, a battery 1396, an indicator 1397, and a motor 1398.

The AP 1310 operates an Operating System (OS) or an application program so as to control a plurality of hardware or software component elements connected to the AP 1310 and executes various data processing and calculations including multimedia data. The AP 1310 may be implemented by, for example, a System on Chip (SoC). The processor 1310 may further include a Graphic Processing Unit (GPU).

The communication module 1320 transmits/receives data in communication between different electronic devices (for example, the electronic device 104 and the server 106) connected to the electronic device 1301 through a network. The communication module 1320 includes a cellular module 1321, a WiFi® module 1323, a BT module 1325, a GPS module 1327, a Near Field Communication (NFC) module 1328, and a Radio Frequency (RF) module 1329.

The cellular module 1321 provides a voice, a call, a video call, a Short Message Service (SMS), or an Internet service through a communication network (for example, Long Term Evolution (LTE), LTE-A, Code Division Multiple Access (CDMA), Wideband CDMA (WCDMA), UMTS, WiBro, GSM or the like). Further, the cellular module 1321 may distinguish and authenticate electronic devices within a communication network by using a subscriber identification module (for example, the SIM card 1324). The cellular module 1321 performs at least some of the functions which can be provided by the AP 1310. For example, the cellular module 1321 may perform at least some of the multimedia control functions.

The cellular module 1321 may include a Communication Processor (CP). Further, the cellular module 1321 may be implemented by, for example, an SoC.

Although the components such as the cellular module 1321 (for example, CP), the memory 1330, and the power managing module 1395 are illustrated as components separate from the AP 1310 in FIG. 8, the AP 1310 may include at least some (for example, cellular module 1321) of the aforementioned components.

The AP 1310 or the cellular module 1321 may load a command or data received from at least one of a non-volatile memory and other components connected to each of the AP 1310 and the cellular module 1321 to a volatile memory and process the loaded command or data. Further, the AP 1310 or the cellular module 1321 may store data received from at least one of other components or generated by at least one of other components in a non-volatile memory.

Each of the WiFi® module 1323, the BT module 1325, the GPS module 1327, and the NFC module 1328 may include, for example, a processor for processing data transmitted/received through the corresponding module. Although the cellular module 1321, the WiFi® module 1323, the BT module 1325, the GPS module 1327, and the NFC module 1328 are illustrated as blocks separate from each other in FIG. 13, at least some (for example, two or more) of the cellular module 1321, the WiFi® module 1323, the BT module 1325, the GPS module 1327, and the NFC module 1328 may be included in one Integrated Chip (IC) or one IC package according to one embodiment. For example, at least some (for example, the communication processor corresponding to the cellular module 1321 and the WiFi® processor corresponding to the WiFi® module 1323) of the processors corresponding to the cellular module 1321, the WiFi® module 1323, the BT module 1325, the GPS module 1327, and the NFC module 1328 may be implemented by one SoC.

The RF module 1329 transmits/receives data, for example, an RF signal. Although not illustrated, the RF module 1329 may include, for example, a transceiver, a Power Amp Module (PAM), a frequency filter, a Low Noise Amplifier (LNA) or the like. Further, the RF module 1329 may further include a component for transmitting/receiving electronic waves over a free air space in wireless communication, for example, a conductor, a conducting wire, or the like. Although the cellular module 1321, the WiFi® module 1323, the BT module 1325, the GPS module 1327, and the NFC module 1328 share one RF module 1329 in FIG. 13, at least one of the cellular module 1321, the WiFi® module 1323, the BT module 1325, the GPS module 1327, and the NFC module 1328 may transmit/receive an RF signal through a separate RF module.

The SIM card 1324 is a card that may be inserted into a slot formed in a particular portion of the electronic device 1301. The SIM card 1324 includes unique identification information (for example, Integrated Circuit Card IDentifier (ICCID)) or subscriber information (for example, International Mobile Subscriber Identity (IMSI).

The memory 1330 (for example, memory 130) may include an internal memory 13313 or an external memory 1334. The internal memory 13313 may include, for example, at least one of a volatile memory (for example, a Random Access Memory (RAM), a dynamic RAM (DRAM), a static RAM (SRAM), a synchronous dynamic RAM (SDRAM), and the like), and a non-volatile Memory (for example, a Read Only Memory (ROM), a onetime programmable ROM (OTPROM), a programmable ROM (PROM), an erasable and programmable ROM (EPROM), an electrically erasable and programmable ROM (EEPROM), a mask ROM, a flash ROM, a NAND flash memory, an NOR flash memory, and the like).

The internal memory 13313 may be a Solid State Drive (SSD). The external memory 1334 may further include a flash drive, for example, a Compact Flash (CF), a Secure Digital (SD), a Micro Secure Digital (Micro-SD), a Mini Secure Digital (Mini-SD), an extreme Digital (xD), or a memory stick. The external memory 1334 may be functionally connected to the electronic device 1301 through various interfaces. The electronic device 1301 may further include a storage device (or storage medium) such as a hard drive.

The sensor module 1340 measures a physical quantity or detects an operation state of the electronic device 1301, and converts the measured or detected information to an electronic signal. The sensor module 1340 may include, for example, at least one of a gesture sensor 1340A, a gyro sensor 1340B, an atmospheric pressure (barometric) sensor 1340C, a magnetic sensor 1340D, an acceleration sensor 1340E, a grip sensor 1340F, a proximity sensor 1340G, a color sensor 1340H (for example, Red, Green, and Blue (RGB) sensor) 1340H, a biometric sensor 1340I, a temperature/humidity sensor 1340J, an illumination (light) sensor 1340K, and a Ultra Violet (UV) sensor 1340M. Additionally or alternatively, the sensor module 1340 may include, for example, a E-nose sensor, an electromyography (EMG) sensor, an electroencephalogram (EEG) sensor, an electrocardiogram (ECG) sensor, an InfraRed (IR) sensor, an iris sensor, a fingerprint sensor (not illustrated), and the like. The sensor module 1340 may further include a control circuit for controlling one or more sensors included in the sensor module 1340.

The input device 1350 includes a touch panel 13513, a (digital) pen sensor 1354, a key 1356, and an ultrasonic input device 1358. For example, the touch panel 13513 may recognize a touch input in at least one type of a capacitive type, a resistive type, an infrared type, and an acoustic wave type. The touch panel 13513 may further include a control circuit. In the capacitive type, the touch panel 13513 can recognize proximity as well as a direct touch. The touch panel 13513 may further include a tactile layer. In this event, the touch panel 13513 provides a tactile reaction to the user.

The (digital) pen sensor 1354 may be implemented, for example, using a method identical or similar to a method of receiving a touch input of the user, or using a separate recognition sheet. The key 1356 may include, for example, a physical button, an optical key, or a key pad. The ultrasonic input device 1358 is a device which can detect an acoustic wave by a microphone (for example, microphone 1388) of the electronic device 1301 through an input means generating an ultrasonic signal to identify data and can perform wireless recognition. The electronic device 1301 receives a user input from an external device (for example, computer or server) connected to the electronic device 1301 by using the communication module 1320.

The display 1360 includes a panel 1362, a hologram device 1364, and a projector 1366. The panel 1362 may be, for example, a Liquid Crystal Display (LCD) or an Active Matrix Organic Light Emitting Diode (AM-OLED). The panel 1362 may be implemented to be, for example, flexible, transparent, or wearable. The panel 1362 may be configured by a touch panel and one or more modules. The hologram device 1364 shows a stereoscopic image in the air by using interference of light. The projector 1366 projects light on a screen to display an image. For example, the screen may be located inside or outside the electronic device 1301. The display 1360 may further include a control circuit for controlling the panel 1362, the hologram device 1364, and the projector 1366.

The interface 1370 includes, for example, a High-Definition Multimedia Interface (HDMI) 13713, a Universal Serial Bus (USB) 1374, an optical interface 1376, and a D-subminiature (D-sub) 1378. The interface 1370 may be included in, for example, the communication interface 160 illustrated in FIG. 1. Additionally or alternatively, the interface 1390 may include, for example, a Mobile High-definition Link (MHL) interface, a Secure Digital (SD) card/Multi-Media Card (MMC), or an Infrared Data Association (IrDA) standard interface.

The audio module 1380 bi-directionally converts a sound and an electronic signal. At least some components of the audio module 1380 may be included in, for example, the input/output interface 140 illustrated in FIG. 1. The audio module 1380 processes sound information input or output through, for example, a speaker 1382, a receiver 1384, an earphone 1386, the microphone 1388, and the like.

The camera module 1391 is a device which can photograph a still image and a video. The camera module 1391 may include one or more image sensors (for example, a front sensor or a back sensor), an Image Signal Processor (ISP) (not shown) or a flash (for example, an LED or xenon lamp).

The power managing module 1395 manages power of the electronic device 1301. Although not illustrated, the power managing module 1395 may include, for example, a Power Management Integrated Circuit (PMIC), a charger Integrated Circuit (IC), or a battery gauge.

The PMIC may be mounted to, for example, an integrated circuit or an SoC semiconductor. A charging method may include wired and wireless charging methods. The charger IC charges a battery and prevent over voltage or over current from flowing from a charger. The charger IC includes a charger IC for at least one of the wired charging method and the wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier or the like may be added.

The battery gauge measures, for example, a remaining quantity of the battery 1396, or a voltage, a current, or a temperature during charging. The battery 1396 may store or generate electricity and supply power to the electronic device 1301 by using the stored or generated electricity. The battery 1396 may include a rechargeable battery or a solar battery.

The indicator 1397 shows particular statuses of the electronic device 1301 or a part (for example, AP 1310) of the electronic device 1301, for example, a booting status, a message status, a charging status and the like. The motor 1398 converts an electrical signal to a mechanical vibration.

Although not illustrated, the electronic device 1301 may include a processing unit (for example, GPU) for supporting a mobile TV. The processing unit for supporting the mobile TV may process, for example, media data according to a standard of Digital Multimedia Broadcasting (DMB), Digital Video Broadcasting (DVB), media flow or the like.

Each of the components of the aforementioned electronic devices may be implemented by one or more components and the name of the corresponding component may vary depending on a type of the electronic device. The electronic device described herein may include at least one of the above described components, a few of the components may be omitted, or additional components may be further included. Also, some of the components of the herein described electronic devices may be combined to form a single entity, and thus may equivalently execute functions of the corresponding components before being combined.

At least some of the devices (e.g., modules or functions thereof) or methods (e.g., operations) of the present invention, for example, may be implemented by an instruction stored in a non-transitory computer-readable storage medium in the form of a programming module. The instruction, when executed by at least one processor (e.g., the processor 120), enables the at least one processor to perform a function corresponding to the instruction. The non-transitory computer-readable storage medium, for example, may be the memory 130. At least a part of the programming module, for example, may be implemented (e.g., executed) by the processor 120. At least a part of the programming module, for example, may include a module, a program, a routine, a set of instructions, or a process for performing at least one function.

The non-transitory computer-readable recording medium may include magnetic media such as a hard disc, a floppy disc, and a magnetic tape, optical media such as a Compact Disc read only memory (CD-ROM) and a Digital Versatile Disc (DVD), magneto-optical media such as a floptical disk, and hardware devices specifically configured to store and execute a program instruction (e.g., programming module), such as a Read Only Memory (ROM), a Random Access Memory (RAM), and a flash memory. Further, the program instruction may include high class language codes that can be executed in a computer by using an interpreter, as well as machine language codes that are made by a compiler. Any of the hardware devices as described above may be configured to work as one or more software modules in order to perform the operations according to various embodiments of the present invention, and vice versa.

Any of the modules or programming modules may include at least one of the above described elements, exclude some of the elements, or further include other additional elements. The operations performed by the modules, programming modules, or other elements according to the present invention may be executed in a sequential, parallel, repetitive, or heuristic manner. Further, some of the operations may be executed in a different order, some of the operations may be omitted, or other operations may be added.

While the present invention has been shown and described with reference to certain embodiments thereof, it should be understood by those skilled in the art that many variations and modifications of the method and apparatus described herein will still fall within the spirit and scope of the present invention as defined in the appended claims and their equivalents.

What is claimed is:

1. A method of playing video on an electronic device, the method comprising:
    when playing a video in a first display mode, determining, based on meta information of the video, a start point and an end point for a section in the video, the section being playable in a second display mode;
    in response to detecting, based on the start point, that the section of the video starts, automatically, and without user input, playing the video in the second display mode; and
    in response to detecting, based on the end point, that the section of the video ends, automatically, and without user input, playing the video in the first display mode.

2. The method of claim 1, wherein the determining the section playable in the second display mode comprises determining at least one of a start time, a duration time, a finish time of the section related to the second display mode.

3. The method of claim 1, further comprising providing information on the determined section to a user.

4. The method of claim 1, further comprising providing an option to change from the first display mode to the second display mode to a user when the section playable in the second display mode is determined.

5. The method of claim 4, wherein providing an option to change from the first display mode to the second display mode to the user includes receiving the option through a guide phrase.

6. The method of claim 5, further comprising continuously playing the video in the first display mode when the option to change from the first display mode to the second display mode is not received during a predetermined time.

7. The method of claim 1,
    wherein the first display mode is at least one of a 2D (two dimensional) display mode and a 3D (three dimensional) display mode, and
    wherein the second display mode is a 360 degree display mode.

8. The method of claim 1, further comprising
displaying a symbol such that a user can manipulate the symbol to view the video in different angles.

9. An apparatus comprising:
a display; and
a processor configured to
when playing a video in a first display mode, determine, based on meta information of the video, a start point and an end point for a section in the video, the section being playable in a second display mode,
in response to detecting, based on the start point, that the section of the video starts, automatically, and without user input, play the video in the second display mode, and
in response to detecting, based on the end point, that the section of the video ends, automatically, and without user input, play the video in the first display mode.

10. The apparatus of claim 9, wherein the processor is configured to determine at least one of a start time, a duration time, a finish time of the section related to the second display mode.

11. The apparatus of claim 9, wherein the processor is further configured to provide information on the determined section to a user.

12. The apparatus of claim 9, wherein the processor is further configured to provide an option to change from the first display mode to the second display mode to a user on a user interface when the section playable in the second display mode is determined.

13. The apparatus of claim 12, wherein the processor is further configured to continuously play the video in the first display mode rather than changing from the first display mode to the second display mode when the option to change from the first display mode to the second display mode is not detected during a predetermined time.

14. The apparatus of claim 9,
wherein the first display mode is at least one of a 2D (two dimensional) display mode and a 3D (three dimensional) display mode, and
wherein the second display mode is a 360 degree display mode.

15. A non-transitory computer readable storage medium having stored thereon a set of computer readable instructions that when executed perform a method of playing video on an electronic device, the method comprising:
when playing a video in a first display mode, determining, based on meta information of the video, a start point and an end point for a section in the video, the section being playable in a second display mode;
in response to detecting, based on the start point, that the section of the video starts, automatically, and without user input, playing the video in the second display mode; and
in response to detecting, based on the end point, that the section of the video ends, automatically, and without user input, playing the video in the first display mode.

* * * * *